United States Patent [19]

Han

[11] Patent Number: 5,818,544
[45] Date of Patent: Oct. 6, 1998

[54] METHOD AND APPARATUS FOR DETECTING WHEN THE CARRIER SIGNAL AND SYMBOL TIMING FOR A TELEVISION SIGNAL IS RECOVERED AND A HIGH DEFINITION TELEVISION EMPLOYING THE METHOD AND APPARATUS

[75] Inventor: Dong-seog Han, Anyang, Rep. of Korea

[73] Assignee: Samsung Electronics Co., Ltd., Kyungki-do, Rep. of Korea

[21] Appl. No.: 688,786

[22] Filed: Jul. 31, 1996

[30] Foreign Application Priority Data

Sep. 23, 1995 [KR] Rep. of Korea ...................... 95-31497

[51] Int. Cl.⁶ ............................ H04N 7/015; H04L 27/06
[52] U.S. Cl. ........................ 348/725; 375/326; 348/726; 348/731
[58] Field of Search ..................................... 375/355, 326, 375/344; 348/725, 726, 426, 731, 732, 733, 194, 735, 737

[56] References Cited

U.S. PATENT DOCUMENTS

| | | | |
|---|---|---|---|
| 4,941,155 | 7/1990 | Chuang et al. | 375/84 |
| 5,544,200 | 8/1996 | An | 375/344 |
| 5,596,607 | 1/1997 | Larsson et al. | 375/340 |
| 5,604,541 | 2/1997 | Kim et al. | 348/426 |

*Primary Examiner*—Andrew I. Faile
*Assistant Examiner*—Uyen Le
*Attorney, Agent, or Firm*—Sughrue, Mion, Zinn, Macpeak & Seas, PLLC

[57] ABSTRACT

An apparatus is provided for detecting when a carrier signal and a symbol timing have been recovered for a demodulated signal corresponding to a received signal. The apparatus contains an estimating circuit and a detection signal generation circuit. The estimating circuit calculates an average value of the demodulated signal and outputs an estimation value which corresponds to the average value. The generation circuit detects when the carrier signal and the symbol timing of the demodulated signal have been recovered based on the estimation value and generates a corresponding recovery completion detection signal. Specifically, the generation circuit includes a carrier signal detection circuit and a symbol timing detection circuit. The carrier signal detection circuit determines that the carrier signal has been recovered when the estimation value exceeds a first threshold value, and the circuit generates a corresponding carrier recovery signal. The symbol timing detection circuit determines that the symbol timing has been recovered when the difference between the estimation value and a previous estimation value is less than a second threshold value, and the circuit generates a corresponding symbol timing recovery signal. The generation circuit outputs the recovery completion detection signal based on the carrier and symbol timing recovery signals. A method corresponding to the apparatus and a high definition television incorporating the apparatus are also provided.

36 Claims, 6 Drawing Sheets

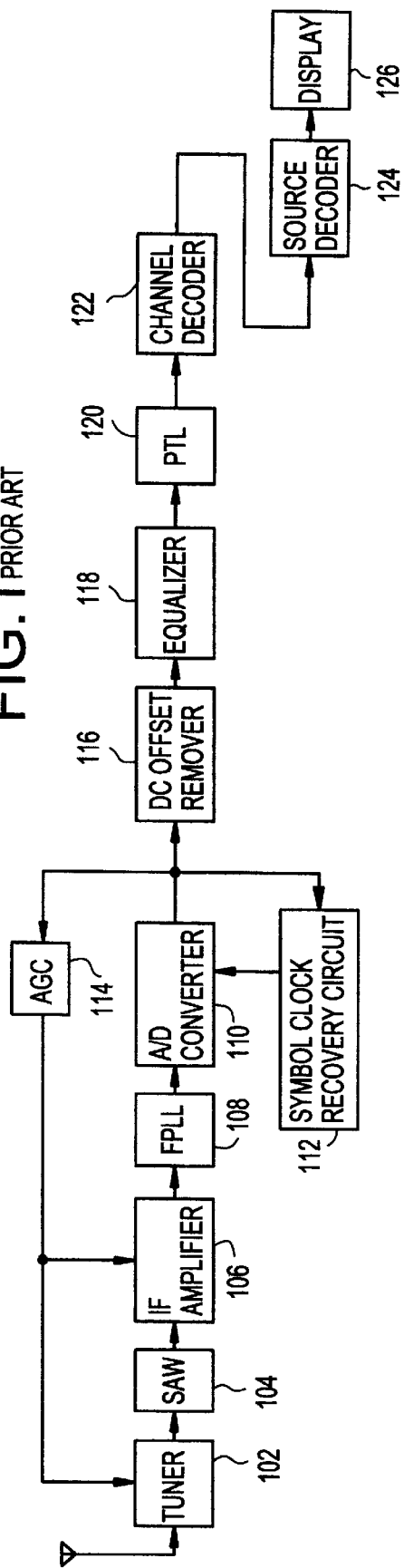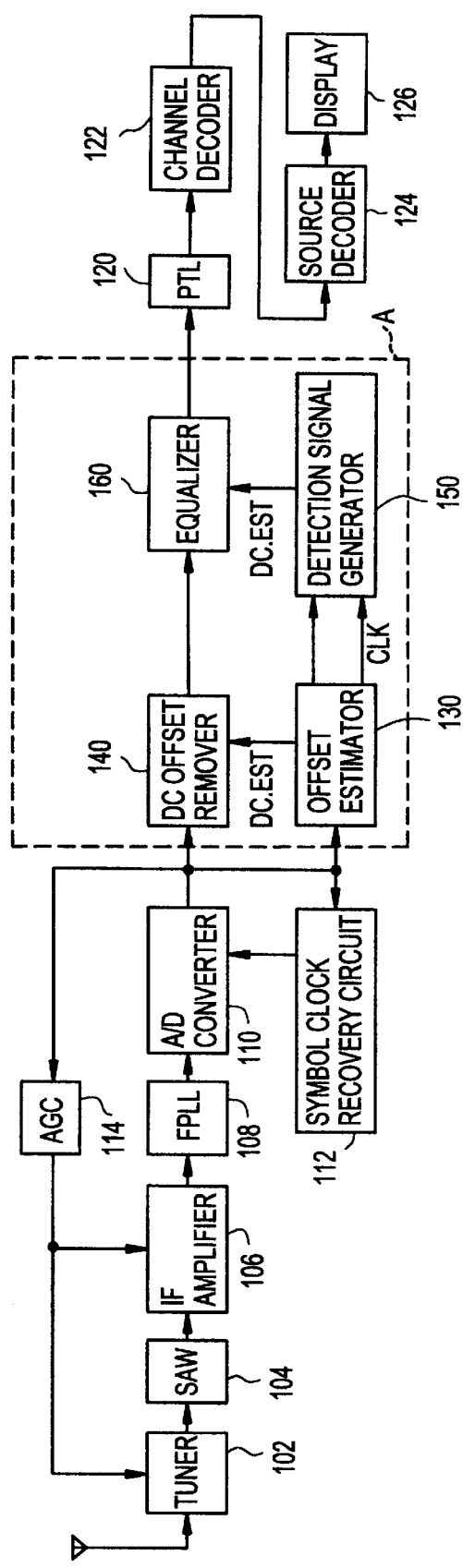

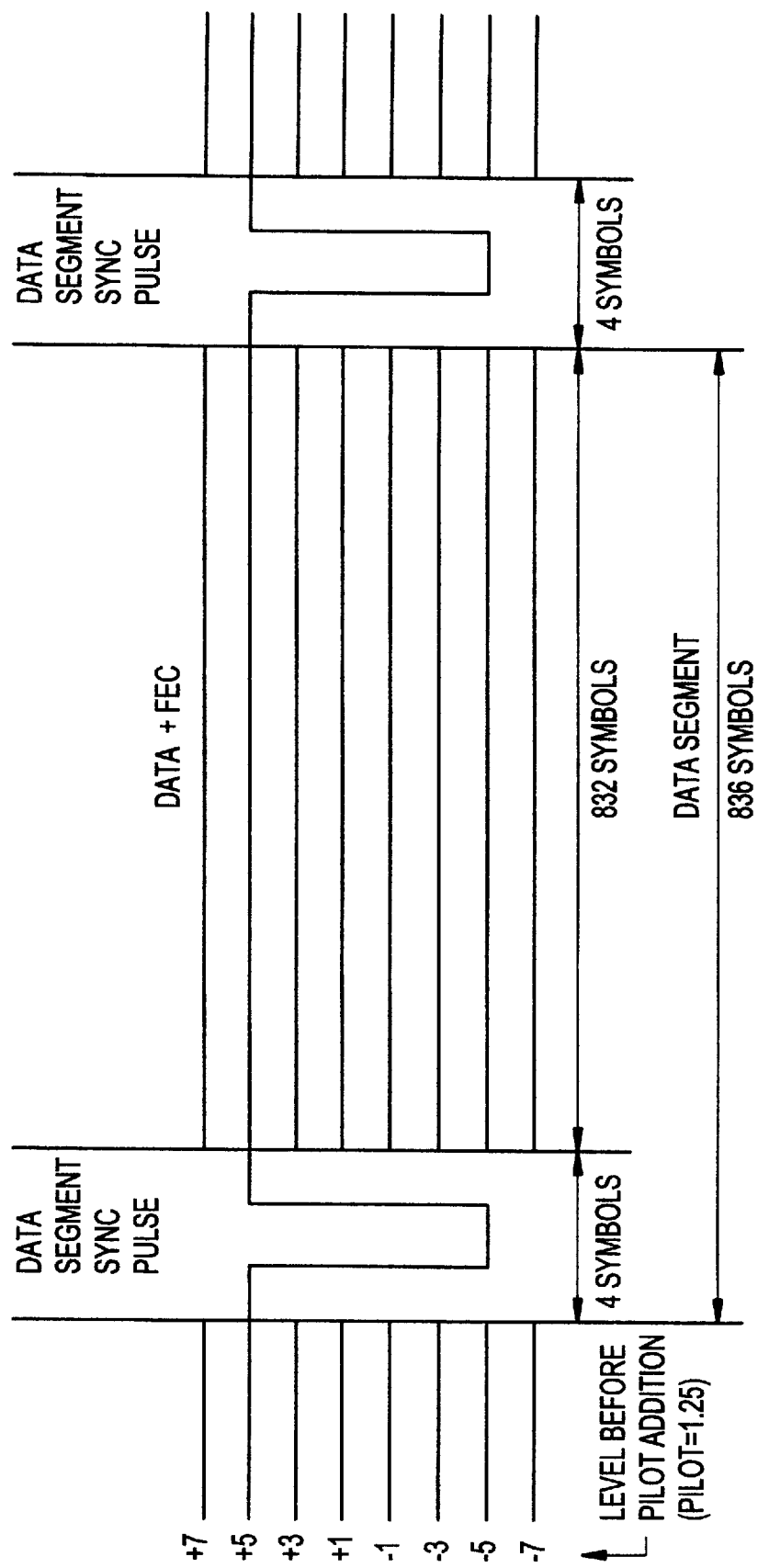

METHOD AND APPARATUS FOR DETECTING WHEN THE CARRIER SIGNAL AND SYMBOL TIMING FOR A TELEVISION SIGNAL IS RECOVERED AND A HIGH DEFINITION TELEVISION EMPLOYING THE METHOD AND APPARATUS

FIELD OF THE INVENTION

The present invention relates to a method and apparatus for detecting when a carrier signal and a symbol timing of a television signal is recovered and relates to a high definition television (HDTV) receiver employing the method and apparatus. More particularly, the present invention relates to a method and apparatus for detecting when a carrier signal and a symbol timing of a television signal is recovered in order to enable an HDTV receiver to operate in a stable manner within a short period of time.

BACKGROUND OF THE INVENTION

A significant amount of effort has been expended in developing a television having a large screen and high resolution. As a result of such effort, a high definition television (HDTV) receiver for receiving HDTV signals has been produced in Japan. Furthermore, the HDTV signals are broadcast in an analog transmission mode in accordance with a multiple sub-Nyquist sampling encoding (MUSE) process.

In the United States, the Grand Alliance (GA) committee has proposed technical standards for designing a HDTV system. Specifically, the GA committee has adopted the vestigial side band (VSB) modulation as a GA-HDTV modulation standard. In particular, the GA committee has adopted an 8-VSB modulation standard having eight levels for a terrestrial broadcast mode and has adopted a 16-VSB modulation standard having sixteen levels for a high speed cable mode.

FIG. 1 illustrates an example of a conventional HDTV receiver proposed by the GA committee. Specifically, the HDTV receiver comprises a tuner 102, a surface acoustic wave (SAW) filter 104, an intermediate frequency (IF) amplifier 106, a frequency and phase locked loop (FPLL) 108, an analog-to-digital (A/D) converter 110, a symbol clock recovery circuit 112, and an automatic gain control (AGC) circuit 114.

The tuner 102 inputs broadcast signals via an antenna and selectively tunes a particular HDTV channel on which a particular modulated HDTV signal is transmitted. Moreover, before the modulated HDTV signal is transmitted, a small DC offset (e.g. 1.25) is added to the signal in order to generate a corresponding pilot signal. After tuning the particular channel, the tuner 102 outputs the modulated signal having a certain central frequency and a certain bandwidth. For example, the tuner 102 may output the signal having a central frequency of 44 MHz and a bandwidth 6 MHz. In addition, the tuner 102 comprises an inner filter and an radio frequency (RF) amplifier. The inner filter is used to selectively pass the particular modulated HDTV signal having the bandwidth of 6 MHz, and the RF amplifier is used to amplify the HDTV signal. However, since the inner filter does not have ideal filtering characteristics, the tuner 102 may also output HDTV signals transmitted on adjacent channels in addition to the modulated HDTV signal transmitted on the particular channel.

The SAW filter 104 has a bandwidth which is exactly equal to the bandwidth of the particular modulated HDTV signal (e.g. a bandwidth of 6 MHz). Accordingly, the HDTV signals transmitted on the particular channel and the adjacent channels are output from the tuner 102 to the SAW filter 104, and the SAW filter 104 outputs only the particular modulated HDTV signal. Therefore, the filter 104 eliminates any interference which may be caused by the signals transmitted on the adjacent channels.

Subsequently, the IF amplifier 106 inputs the modulated HDTV signal and outputs a corresponding amplified signal. In particular, the amplifier 106 amplifies the HDTV signal by an amount necessary to maintain the input of the A/D converter 110 at proper levels. For example, if the eight levels of the modulated HDTV signal equal ±1, ±3, ±5, and ±7 and the DC offset added to the modulated HDTV signal equals 1.25, the proper levels of the signal supplied to the A/D converter 110 equal +5.75, +3.75, +1.75, 0.25, 2.25, 4.25, 6.25, and 8.25. In other words, the proper levels are obtained by adding the DC offset to the eight levels of modulated HDTV signal.

In order to ensure the signal output from the amplifier 106 is amplified by the appropriate amount, the AGC circuit 114 inputs the digital signal output from the A/D converter and generates a corresponding AGC signal to control the gain of the amplifier 106. In addition, the AGC circuit 114 may also control the gain of the RF amplifier contained in the tuner 102. In particular, the AGC circuit 114 may output the AGC signal to instruct the RF amplifier to further amplify the modulated HDTV signal if the gain of the amplifier 106 is insufficient.

The amplifier 106 outputs the amplified signal to the FPLL circuit 108, and the FPLL circuit 108 recovers the carrier signal of the HDTV signal based on the amplified signal. In particular, the FPLL circuit 108 recovers the carrier signal by detecting the pilot signal contained in the amplified signal and adjusting the local oscillation frequency of the tuner 102 such that the pilot signal exists at a frequency of 0 Hz. Then, the FPLL 108 demodulates the amplified signal into a baseband signal by multiplying the amplified signal by the recovered carrier signal.

The symbol clock recovery circuit 112 also inputs the digital signal output from the A/D converter 110 and estimates when the A/D converter 110 should sample the baseband signal output from the FPLL 108. Then, the recovery circuit 112 generates a symbol clock signal which corresponds to such estimation and outputs the signal to the converter 110. Consequently, the A/D converter 110 inputs the baseband signal and converts such signal into the digital signal in accordance with the symbol clock signal recovered the symbol clock recovery circuit 112.

As further shown in FIG. 1, the HDTV receiver additionally comprises a DC offset remover 116, an equalizer 118, a phase tracking loop (PTL) 120, a channel decoder 122, a source decoder 124, and a display device 126. The DC offset remover 116 removes the DC offset corresponding to the pilot signal from the digital signal output from the A/D converter 110. Furthermore, since the A/D converter 110 is a non-linear device, an additional DC offset is further added to the signal when the converter 110 transforms the amplified signal into the digital signal. By removing the DC offsets from the digital signal, the original signal level of the particular HDTV signal can be recovered. In order to more fully understand how the DC offset remover 116 detects and removes the DC offset from the digital signal, an example of the format of the particular HDTV signal will be described below.

FIG. 2 illustrates an example of the format of an HDTV data frame which corresponds to the particular HDTV signal. Specifically, the HDTV data frame comprises a first field and a second field. The first field includes 312 data segments and a first field sync segment FIELD SYNC #1, and the second field includes 312 data segments and a second field sync segment FIELD SYNC #2.

FIG. 3 shows a detailed example of the format of one of the data segments contained in the first or second field. In particular, the data segment comprises four symbols which constitute a data segment sync pulse and 832 symbols which constitute data and forward-error-correction (FEC) signals. Moreover, the data segment sync pulse is inserted into the eight level digital data stream at the beginning of each data segment and has a predetermined pattern. For instance, as illustrated in FIG. 3, the data segment sync pulse comprises four sequential symbols having the levels +5, −5, −5, and +5, respectively. Furthermore, each of the remaining 832 symbols in the data segment have one of the eight levels ±1, ±3, ±5 and ±7.

Before the particular HDTV signal is transmitted from the transmission station, the DC offset having a level of 1.25 is added to the four symbols corresponding to the data segment sync pulse and to remaining 832 symbols. As mentioned above, such DC offset adds the pilot signal to the HDTV signal.

In addition, the first and second field sync segments FIELD SYNC #1 and FIELD SYNC #2 respectively contain first and second reference field sync signals which are recorded with respect to 511 of the 832 symbols. The reference field sync signals have the same absolute value, but the signs of such signals have opposite values. Since the DC offset level of 1.25 is also added to the first and second reference field sync signals, the average level of the first and second reference field sync signals equals the DC offset level of 1.25.

Accordingly, the DC offset remover 116 is able to detect the value of the DC offset level by calculating the average level of the first and second reference field sync signals. As a result, the offset remover 116 removes the DC offset level from the digital signal output from the A/D converter 110 by subtracting the average DC offset level from the such digital signal. Then, the remover 116 outputs the corresponding pure digital signal.

The equalizer 118 inputs the pure digital signal, removes any multi-path distortion contained in such signal, and outputs an undistorted signal. In general, multi-path distortion results from multi-path channel transmission which is generated by the reflection of electromagnetic waves from the landscape, buildings, airplanes, etc. when the HDTV signal is broadcast over the earth. Moreover, the multi-path distortion causes the images contained in the original HDTV signal to be overlapped with other images that are delayed and attenuated with respect to the image of the original signal. Moreover, such distortion distorts the frequency characteristics of the original HDTV signal.

The PTL 120 inputs the undistorted signal and corrects any phase errors within such signal which were not completely eliminated by the FPLL 108. Afterwards, the PTL 120 outputs a phase corrected signal.

The channel decoder 122 is used to decode the phase corrected signal in a manner which corresponds to the manner in which the original HDTV signal was encoded before it was transmitted. For example, in order to reduce the symbol errors generated during transmission, the HDTV signal is coded via a Reed-Solomon (RS) coding process, an interleaving operation, and a Trellis coded modulation (TCM) process before being transmitted.

As a result, the channel decoder 122 inputs the phase corrected signal from the PTL 120 and decodes such signal. Specifically, the decoder 122 may perform a Trellis demodulation operation on the phase corrected signal to produce an interleaved signal and may perform a de-interleaving operation on the interleaved signal to produce a de-interleaved signal. Finally, the decoder 122 may perform an RS decoding operation on the de-interleaved signal based on the parity of such signal in order to produce an error corrected signal.

The source decoder 124 inputs the error corrected signal and performs a variable length decoding operation to produce decoded signal and performs an inverse quantizing operation on the decoded signal to generate inverse quantized data. Subsequently, the decoder 124 subjects the inverse quantized data to an inverse discrete cosine transform (IDCT) operation in accordance with the quantization step size used during the encoding process of the original HDTV signal. As a result, the compressed data is converted in the original HDTV signal, and the original signal is displayed via the display device 126.

In order for an HDTV receiver to operate in an optimal manner, it should completely recover the carrier signal by precisely controlling the synchronization frequency of the tuner 102 immediately after power is supplied to the receiver. Then, the symbol timing should be recovered by the symbol clock recovery circuit 112.

Moreover, in order for the remaining components of the HDTV receiver (e.g. the equalizer 118, the PTL 120, etc.) to operate properly and efficiently, the carrier signal and the symbol timing of the HDTV receiver should be completely recovered before the remaining components begin to perform their corresponding functions. As a result, in order for the receiver to operate normally shortly after receiving power, the equalizer 116 and the remaining components should only be enabled after both the carrier signal and the symbol timing are completely recovered.

However, in the HDTV receiver shown in FIG. 1, all of the components begin to simultaneously perform their corresponding operations immediately after the power is applied to the receiver. Accordingly, many of the components of the receiver (e.g. the equalizer 118) begin inputting and processing erroneous data and thus, experience transient malfunctions. Consequently, even when the appropriate data is subsequently input to the equalizer 118 and the other components after the carrier signal and the symbol timing have been completely recovered, a significant amount of time is required until such components operate normally due to the transient malfunctions. Furthermore, the time required for the equalizer 118 and the remaining components to operate normally may be longer than the time that is required to completely recover the carrier signal and the symbol timing. Accordingly, the conventional HDTV receiver suffers from the problem that it is not capable of detecting when the carrier signal and symbol timing are completely recovered before enabling the operation of the equalizer 118 and the remaining components.

SUMMARY OF THE INVENTION

In order to overcome the problems above, one object of the present invention is to provide a circuit for detecting when the carrier signal and the symbol timing of a signal receiver have been recovered.

Another object of the present invention is to provide a high definition television (HDTV) which is capable of detecting when the carrier signal and the symbol timing have been recovered.

Yet another object of the present invention is to provide a method for detecting when the carrier signal and the symbol timing have been recovered In order to achieve one of the objects above, a circuit for detecting when a carrier signal and a symbol timing of a demodulated signal corresponding to a received signal has been recovered is provided. In particular, the circuit comprises: estimating means for calculating an average value of a predetermined number of symbols of said demodulated signal and for outputting an estimation value which corresponds to said average value; and detection signal generation means for detecting when said carrier signal and said symbol timing of said demodulated signal have been recovered based on said estimation value and for generating a recovery completion detection signal when said carrier signal and said symbol timing have been recovered.

In order to achieve another one of the objects above, a high definition television (HDTV) is provided. In particular, the HDTV comprises: a tuner for selectively tuning a particular channel on which a particular HDTV signal; an intermediate frequency (IF) amplifier which inputs and amplifies said particular HDTV signal to produce an amplified signal, wherein said amplified signal comprises a pilot signal; a frequency and phase locked loop (FPLL) circuit, wherein said FPLL circuit inputs said amplified signal, recovers a carrier signal corresponding to said amplified signal by evaluating said pilot signal, and demodulates said amplified signal into a baseband signal based on said carrier signal; an analog-to-digital (A/D) converter which inputs said baseband signal and converts said baseband signal into a digital signal; a symbol clock signal recovery circuit which inputs said digital signal, estimates a sampling point at which said A/D converter should sample said baseband signal, and outputs a symbol clock signal in accordance with said sampling point to said A/D converter; an offset remover, wherein said offset remover calculates an average value of said digital signal for a predetermined number of symbols of said digital signal, generates an estimation value based on said average value, and removes an offset contained within said digital signal by subtracting said estimation value from said digital signal to produce a pure digital signal; a detection signal generator, which inputs said estimation value, determines when said carrier signal has been recovered based on said estimation value, determines when a symbol timing of said baseband signal has been recovered based on said estimation value, and generates a recovery completion detection signal when said carrier signal and said symbol timing have been recovered; and an equalizer, which inputs said pure digital signal and said recovery completion detection signal, begins equalizing said pure digital signal when said recovery completion detection signal indicates that said carrier signal and said symbol timing have been recovered, and outputs a corresponding undistorted signal.

In order to achieve yet another one of the objects above, a method for detecting when a carrier signal and a symbol timing of a demodulated signal corresponding to a received television signal has been recovered is provided. In particular, the method comprises the steps of: (a) calculating an average value of a predetermined number of symbols of said demodulated signal; (b) determining an estimation value which corresponds to said average value; and (c) determining when said carrier signal and said symbol timing of said demodulated signal have been recovered based on said estimation value.

BRIEF DESCRIPTION OF THE DRAWINGS

The above objects and advantages of the present invention will become more apparent by describing preferred embodiments of the present invention with reference to the attached drawings in which:

FIG. 1 is a diagram of a conventional high definition television (HDTV);

FIG. 3 is a diagram showing the structure of an HDTV data segment;

FIG. 4 is a diagram of an HDTV according to an embodiment of the present invention;

DETAILED DESCRIPTION OF THE INVENTION

Figure 2:
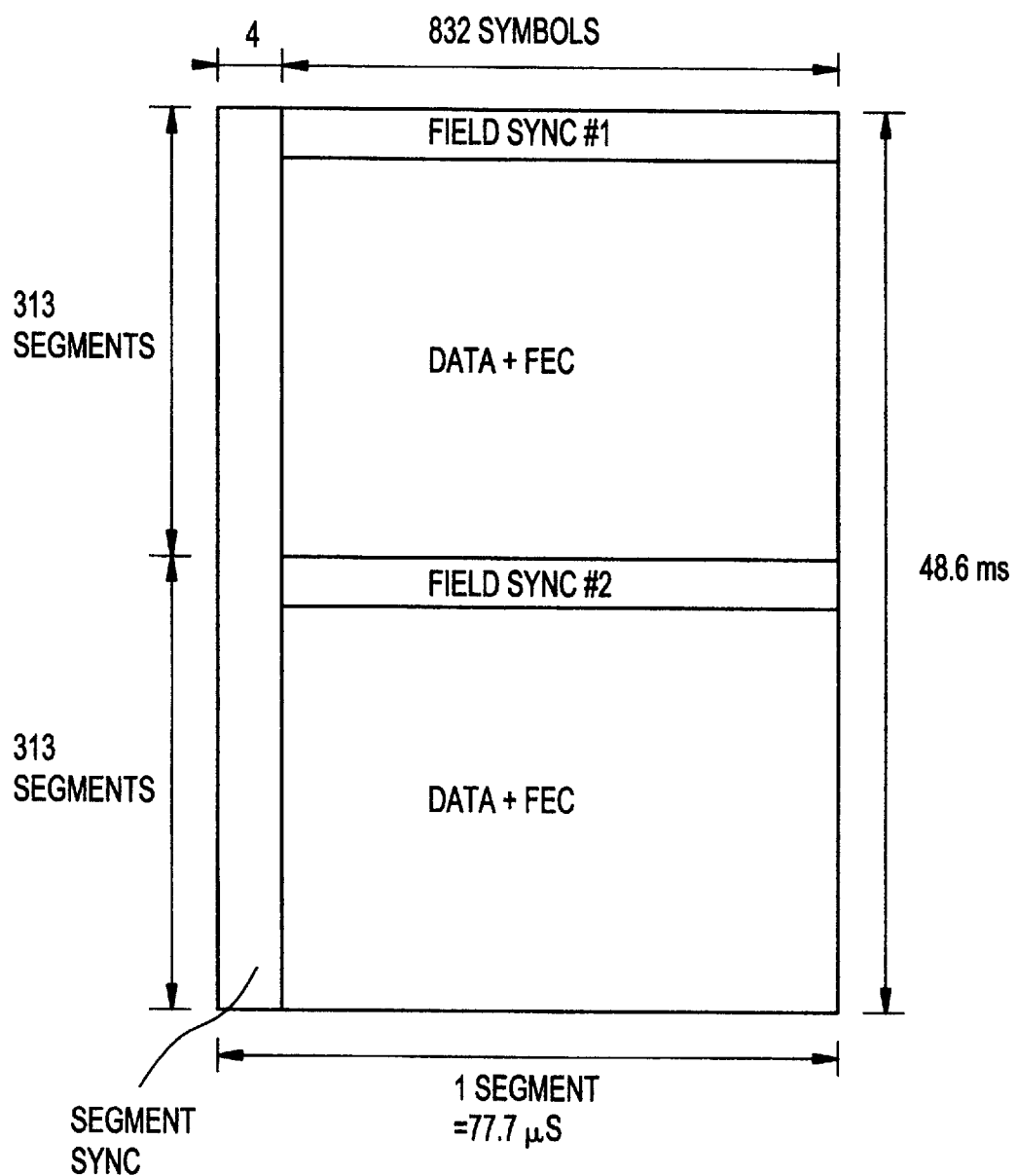
FIG. 2 is a diagram showing the structure of an HDTV data frame.

An example of an illustrative embodiment of an HDTV receiver of the present invention is shown in FIG. 4. In addition, the components of the receiver shown in FIG. 4 which are similar to the components of the receiver shown in FIG. 1 are designated by the same reference numerals. Accordingly, the description of such components will be omitted.

The HDTV receiver of the present embodiment has a portion A which comprises a DC offset estimator 130, a DC offset remover 140, a detection signal generator 150, and an equalizer 160. The DC offset estimator 130 inputs the digital signal output from the A/D converter 110 and calculates the average value of the DC offset contained in N symbols of the digital data. (N is a predetermined number). Subsequently, the estimator 130 outputs a DC estimation value (or DC frequency offset estimation value) DC EST which corresponds to the average value of the DC offset and outputs a clock signal CLK having period of N symbols.

The DC offset remover 140 inputs the digital signal from the A/D converter 110 and the DC estimation value DC EST generated by the estimator 130. Then, the remover 140 removes the DC offset from the digital signal by subtracting the estimation value DC EST from the digital signal and outputs the corresponding pure digital signal.

The detection signal generator 150 inputs the DC estimation value DC EST and the clock signal CLK from the DC offset estimator 130. Afterwards, the generator 150 produces a recovery completion detection signal in accordance with the value DC EST and the clock signal CLK. In particular, the detection signal generator 150 determines when both the carrier signal and the symbol timing have been completely recovered and outputs the detection signal at such time.

The equalizer 160 inputs the detection signal from the generator 150 and begins performing its appropriate function after receiving such signal. As a result, the equalizer 160 only starts operating when the carrier signal and symbol timing have been completely recovered. Moreover, after the equalizer 160 begins operating, the PTL 120, the channel decoder 122, and the source decoder 124 sequentially start operating.

In FIG. 4, the DC offset estimator 130 is depicted as a distinct and separate component of the HDTV receiver. However, one skilled in the art will readily understand that the estimator 130 may be incorporated into the DC offset remover 140 or into the detection signal generator 150.

Figure 5:
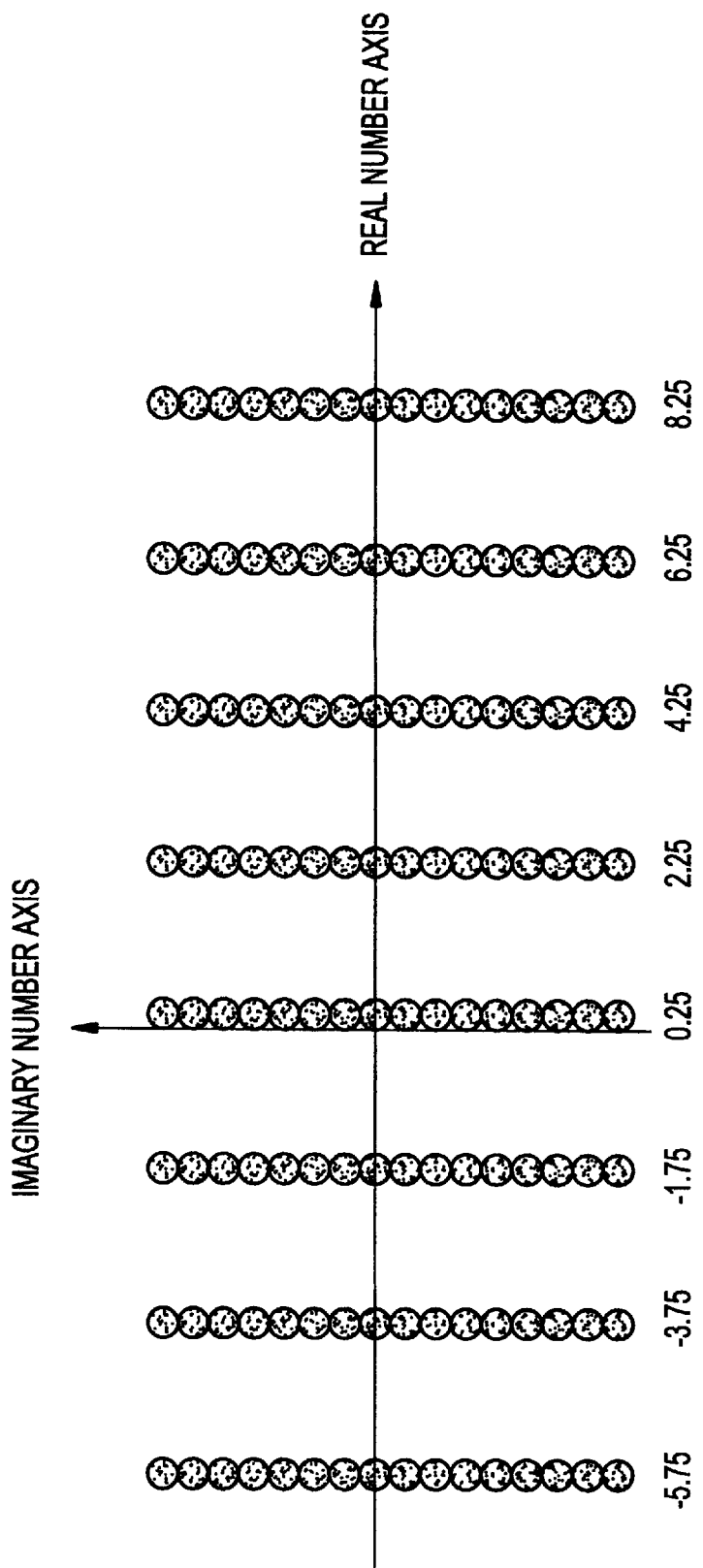
FIG. 5 is a diagram showing a format of VSB transmission signal having eight levels.

An example of the signal which is output from the A/D converter 110 when the carrier signal is completely recovered is illustrated in FIG. 5. In particular, the signal corresponds to a VSB signal having a format according to the 8-VSB modulation standard and is represented via a graph comprising a complex plane. Moreover, the signal relates to the original VSB signal which is generated in the broadcast transmission station and which has eight levels −7, −5, −1, 1, 3, 5, and 7. However, before the original signal is transmitted, a DC offset of 1.25 is added to the original signal to produce the VSB signal having the levels −5.75, −3.75, −1.75, 0.25, 2.25, 4.25, 6.25, and 8.25 shown in FIG. 5.

Also, the HDTV receiver typically processes only the real number component of a signal and does not process the complex component. However, FIG. 5 represents the signal output from the A/D converter with a complex plane, and such signal is represented as a complex signal due to the fact that the converter 110 performs a Hilbert transform operation.

Figure 6:
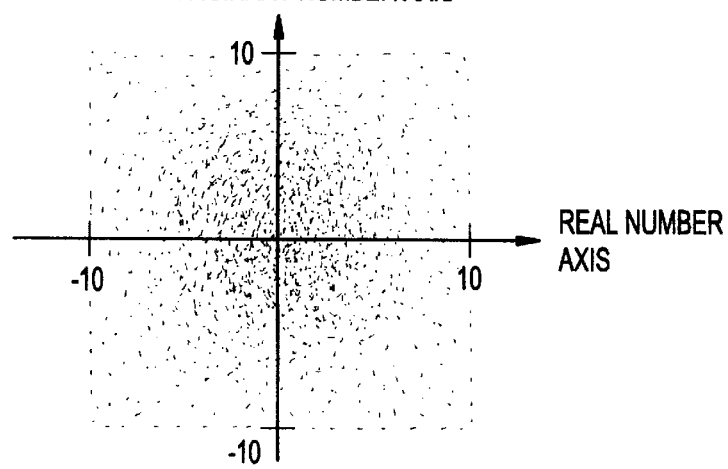
FIG. 6 is a scattered plot of the VSB transmission signal in an unlocked frequency state.

On the other hand, if the carrier signal has not been precisely recovered, a frequency error occurs. As a result, the complex frequency of the signal shown in FIG. 5 would be scattered around the origin of the complex plane such that the coordinates continuously rotate in an arbitrary direction. An example of such a situation is shown in FIG. 6. Since the signal output by the A/D converter 110 is arbitrarily located in the complex plane, the average value of the DC offset of such signal is approximately zero. Accordingly, the average value of the DC offset estimated by the DC offset estimator 130 is approximately zero.

As illustrated above, when the carrier signal is not recovered, the DC offset of the data is approximately zero. On the other hand, when the carrier is recovered, the DC offset of the data is approximately 1.25. Furthermore, when the symbol timing has been completely recovered, the change in the level of the DC offset is very small.

Figure 7:
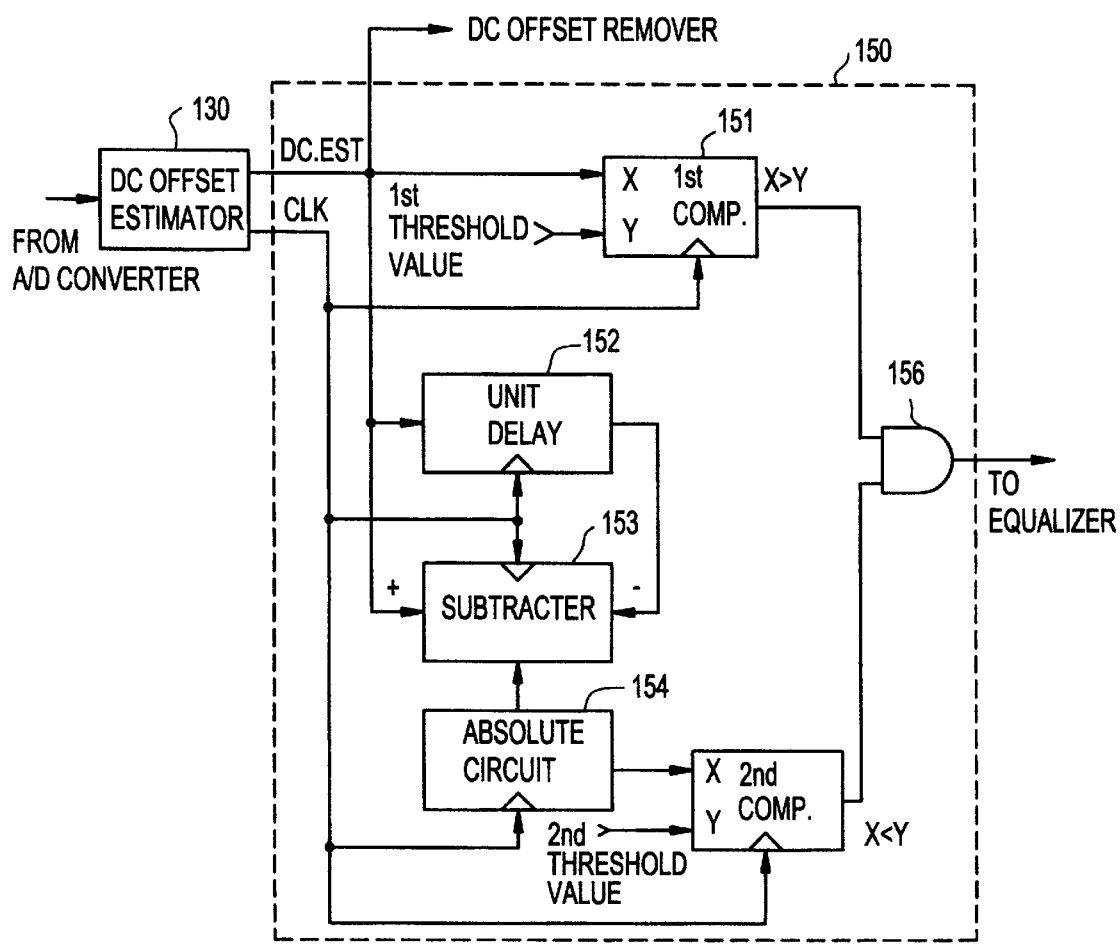
FIG. 7 is a diagram of the detection signal generator shown in FIG. 4.

Due to the characteristics above, an illustrative embodiment of the detection signal generator 150 may constructed as shown in FIG. 7. Specifically, the generator 150 may comprise a first comparator 151, a unit delay 152, a subtracter 153, an absolute circuit 154, a second comparator 155, and an AND gate 156.

The first comparator 151 comprises a first input port X, a second input port Y, and a clock port. The first input port X inputs the estimation value DC EST from the DC offset estimator 130, and the second input port Y receives a first threshold value. In addition, the clock port inputs the clock signal CLK output from the estimator 130. As a result of the above configuration, the comparator 151 outputs a carrier recovery signal in synchronicity with the clock signal CLK when the value DC EST is greater than the first threshold value.

The unit delay 152 comprises an input port and clock port which respectively input the estimation value DC EST and the clock signal CLK from the DC offset estimator 130. Consequently, the delay 152 inputs the estimation value DC EST and delays the output of the estimation value DC EST in accordance with the clock signal CLK.

The subtracter 153 comprises a positive port, a negative port, and a clock port. The positive port inputs the DC estimation value DC EST, and the clock port inputs the clock signal CLK. Furthermore, the negative port inputs the delayed estimation value output from the unit delay 152. As a result, the subtracter 153 subtracts the delayed estimation value from the current DC estimation value DC EST and outputs a corresponding difference signal.

The absolute circuit 154 comprises an input port which inputs the difference signal from the subtracter 153 and a clock port which inputs the clock signal CLK from the estimator 130. Then, the absolute circuit 154 calculates the absolute value of the difference signal and outputs the absolute value in synchronicity with the clock signal CLK.

The second comparator 155 comprises a first input port X, a second input port Y, and a clock port. The first input port X inputs the absolute value from the absolute value circuit 154, and the second input port Y receives a second threshold value. In addition, the clock port inputs the clock signal CLK output from the estimator 130. Consequently, the comparator 155 outputs a symbol timing recovery signal in synchronicity with the clock signal CLK when the absolute value is less than the second threshold value.

The AND gate 156 inputs the carrier recovery signal from the comparator 151 and the symbol timing recovery signal from the comparator 155. As a result, the AND gate 156 outputs the detection signal to the equalizer 160 when the carrier recovery signal and the symbol timing recovery signal are both high.

The operation of the detection signal generator 150 shown in FIG. 7 will be described below. First, the DC offset estimator 130 calculates the average value of the DC offset for N symbols of the digital signal output by the A/D converter 110 and outputs a corresponding DC estimation value DC EST. Furthermore, the clock signal CLK output by the estimator 130 has a period of N symbols. Thus, whenever a new estimation value DC EST is output by the estimator 130, the clock signal CLK is likewise output.

The first comparator 151 inputs the current estimation value DC EST and determines whether or not the carrier signal has been completely recovered based on such value DC EST. In particular, if the carrier signal has not been recovered, the average value of the DC offset will be approximately zero (see FIG. 6), and thus, the value of the estimation value DC EST will also be approximately zero. In contrast, if the carrier signal is completely recovered, each of the DC offset levels of the symbols approaches 1.25 (see FIG. 5), and thus, the value DC EST approaches 1.25.

Consequently, if the first threshold value equals an appropriate value (e.g. 1.00), the comparator 151 will output a high carrier recovery signal if the estimation value DC EST is greater than 1.00 and will output a low carrier recovery signal if the estimation value DC EST is less than or equal to 1.00. In other words, the comparator 151 will output a high carrier recovery signal when the carrier signal has been recovered and will output a low carrier recovery signal when the carrier signal has not been recovered. Also, the value of the first threshold value is not limited to 1.00, but may be any value between zero and 1.25 which enables the comparator 151 to correctly determine when the carrier signal has been recovered.

The unit delay 152 inputs the current estimation value DC EST output from the DC offset estimator 130 and outputs the previous DC estimation value DC EST based on the clock signal CLK. The subtracter 153 inputs the previous value DC EST from the delay 152 and the current value DC EST from the estimator 130 and outputs the difference between the previous and current values DC EST. Then, the absolute circuit 154 calculates the absolute value of the difference and outputs such absolute value.

The second comparator 155 inputs the absolute value of the difference between the current value DC EST and the previous value DC EST and determines whether or not the symbol timing has been recovered. Specifically, if the symbol timing has not been recovered, a substantial amount of timing errors exist, and thus, the difference between the current and previous DC estimation values DC EST will be rather large. On the other hand, if the symbol timing is completely recovered, the number of timing errors decreases, and the difference between the current and previous values DC EST decreases.

Therefore, if the second threshold value equals an appropriate value, the comparator 155 will output a high symbol timing recovery signal if the difference between the current and previous values DC EST is less than the second threshold value and will output a low symbol timing recovery signal if the difference is greater than or equal to the threshold value. In other words, the comparator 155 will output a high symbol timing recovery signal when the symbol timing has been recovered and will output a low symbol timing recovery signal when the symbol timing has not been recovered.

In summary, if the carrier signal has not been recovered (i.e. the frequency has not been locked by the FPLL 108), the average value of the DC offset will be zero. On the other hand, if the carrier signal has been completely recovered (i.e. the frequency has been locked), the average value approaches 1.25. Moreover, as the frequency is being locked by the FPLL 108, timing errors decrease, and the symbol clock recovery circuit 112 begins to output an accurate symbol clock signal. When the symbol timing has been recovered, the value of DC offset does not substantially change.

If the first and second comparators 151 and 155 respectively output a high carrier recovery signal and a high symbol timing recovery signal, the AND gate 156 outputs a high detection signal. Consequently, if the detection signal is used to enable the equalizer 160, the equalizer 160 will only begin to perform its operation when the carrier signal and the symbol timing have been recovered. Furthermore, once the equalizer 160 begins to operate, the remaining components sequentially start to perform their functions.

Figure 8:
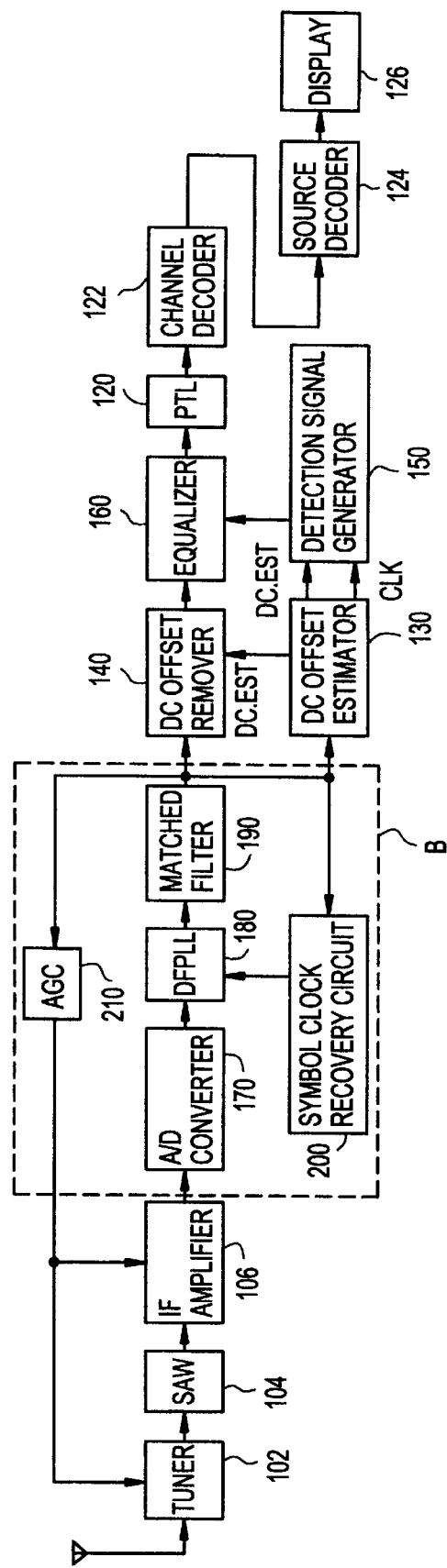
FIG. 8 is a diagram of an HDTV according to another embodiment of the present invention.

Another example of an illustrative embodiment of an HDTV receiver of the present invention is shown in FIG. 8. In addition, the components of the receiver shown in FIG. 8 which are similar to the components of the receiver shown in FIG. 4 are designated by the same reference numerals. Accordingly, the description of such components will be omitted.

The HDTV receiver of the present embodiment has a portion B which comprises an A/D converter 170, a digital frequency and phase locked loop (DFPLL) 180, a matched filter 190, a symbol clock recovery circuit 200, and an AGC circuit 210. The A/D converter 170 inputs the amplified signal from the IF amplifier 106 and converts such signal into a digital signal.

The DFPLL 180 recovers the carrier signal contained in the digital signal by using a pilot signal included in the data signal. Then the DFPLL 180 extracts baseband signal from the digital signal by multiplying the digital signal by the carrier signal.

The matched filter 190 maximizes the energy of the baseband signal output from the DFPLL 180. Specifically, the filter 190 minimizes the interference between symbols when a multi-path channel transmission does not exist.

The symbol clock recovery circuit 200 inputs the filtered signal output from the matched filter 190 and recovers the symbol clock signal in accordance with filtered signal. Subsequently, the symbol clock signal is output to the DFPLL 180 to instruct the DFPLL 180 when to sample the digital signal output from the A/D converter 170.

The AGC circuit 210 generates an AGC signal in response to the amplitude of the data signal output by the matched filter 190 and outputs the AGC signal to the tuner 102 and the IF amplifier 106. As in the previous embodiment, the AGC signal controls the gain of the IF amplifier 106 such that particular levels of the signals input to the matched filter 190 are maintained. Furthermore, if the gain of the IF amplifier 106 is insufficient, the AGC signal controls the gain of the internal RF amplifier of the tuner 102 to further amplify the particular modulated HDTV signal.

The filtered signal output by the matched filter 190 is also input to the DC offset estimator 130 and the DC offset remover 140. The operations of the estimator 130, the remover 140, and the remaining components of the HDTV receiver are the same as the corresponding operations described in the previous embodiment shown in FIG. 4.

As described above, the HDTV receiver of the present invention is capable of completely recovering the carrier signal and the symbol timing recovery. Thus, the normal operation of the receiver can be realized within a short period of time.

Please note that in the description of the above embodiments, the reception of a VSB signal having eight levels was described to merely illustrate the operation of the HDTV receiver. However, the scope of the present invention is not limited to the particular signals which are received. Furthermore, please note that the remaining aspects of the embodiments described above are likewise illustrative and that the scope of the invention should not be limited by such embodiments.

What is claimed is:

1. A circuit for detecting when a carrier signal and a symbol timing have been recovered for a demodulated signal corresponding to a received signal, comprising:

estimating means for calculating an average value of at least part of said demodulated signal for a predetermined number of symbols of said demodulated signal and for outputting an estimation value which corresponds to said average value; and detection signal generation means for detecting when said carrier signal and said symbol timing of said demodulated signal have been recovered based on said estimation value and for generating a recovery completion detection signal when said carrier signal and said symbol timing have been recovered.

2. A circuit as claimed in claim 1, wherein said detection signal generation means comprises:

carrier signal detection means for detecting when said carrier signal has been recovered by comparing said estimation value with a first threshold value and for outputting a carrier recovery signal which indicates whether or not said carrier signal has been recovered;

symbol timing detection means for detecting when said symbol timing has been recovered based on a difference between said estimation value and a previous estimation value output from said estimating means and for outputting a symbol timing recovery signal which indicates whether or not said symbol timing has been recovered; and a signal generating circuit which inputs said carrier recovery signal and said symbol timing recovery signal and which outputs said recovery completion detection signal when said carrier recovery signal indicates that said carrier signal has been recovered and said symbol timing recovery signal indicates that said symbol timing has been recovered.

3. A circuit as claimed in claim 2, wherein said carrier signal detection means comprises a first comparator for comparing said estimation value with said first threshold value and outputting said carrier recovery signal.

4. A circuit as claimed in claim 2, wherein said symbol timing detection means comprises:

a delay circuit which inputs said previous estimation value and delays said previous estimation value for a predetermined time period;

an arithmetic circuit which determines a difference between said previous estimation value output from said delay circuit and said estimation value output from said estimating means; and a second comparator which compares said difference output by said arithmetic circuit with a second threshold value and outputs said symbol timing recovery signal.

5. A circuit as claimed in claim 4, wherein said arithmetic circuit comprises:

a subtracter which determines a subtraction value between said previous estimation value and said estimation value; and an absolute circuit which inputs said subtraction value, determines an absolute value of said subtraction value, and outputs said absolute value as said difference.

6. A circuit as claimed in claim 4, wherein said carrier signal detection means comprises a first comparator for comparing said estimation value with said first threshold value and outputting said carrier recovery signal.

7. A circuit as claimed in claim 4, wherein said predetermined time period is equal to a period of said predetermined number of symbols.

8. A circuit as claimed in claim 2, wherein said signal generating circuit comprises an AND gate.

9. A circuit as claimed in claim 1, further comprising equalizing means for equalizing said demodulated signal to generate an equalized signal, wherein said equalizing means receives said recovery completion detection signal and begins equalizing said demodulated signal after receiving said recovery completion detection signal.

10. A high definition television (HDTV) comprising:

a tuner for selectively tuning a particular channel on which a particular HDTV signal is transmitted;

an intermediate frequency (IF) amplifier which inputs and amplifies said particular HDTV signal to produce an amplified signal, wherein said amplified signal comprises a pilot signal;

a frequency and phase locked loop (FPLL) circuit, wherein said FPLL circuit inputs said amplified signal, recovers a carrier signal corresponding to said amplified signal by evaluating said pilot signal, and demodulates said amplified signal into a baseband signal based on said carrier signal;

an analog-to-digital (A/D) converter which inputs said baseband signal and converts said baseband signal into a digital signal;

a symbol clock signal recovery circuit which inputs said digital signal, estimates a sampling point at which said A/D converter should sample said baseband signal, and outputs a symbol clock signal in accordance with said sampling point to said A/D converter;

an offset remover, wherein said offset remover calculates an average value of an offset of said digital signal for a predetermined number of symbols of said digital signal, generates an estimation value based on said average value, and removes said offset contained in said digital signal by subtracting said estimation value from said digital signal to produce a pure digital signal;

a detection signal generator, which inputs said estimation value, determines when said carrier signal has been recovered based on said estimation value, determines when a symbol timing of said baseband signal has been recovered based on said estimation value, and generates a recovery completion detection signal when said carrier signal and said symbol timing have been recovered; and an equalizer, which inputs said pure digital signal and said recovery completion detection signal, begins equalizing said pure digital signal when said recovery completion detection signal indicates that said carrier signal and said symbol timing have been recovered, and outputs a corresponding undistorted signal.

11. A high definition television (HDTV) as claimed in claim 10, further comprising:

a phase tracking loop (PTL) circuit which inputs said undistorted signal, corrects a phase error in said undistorted signal, and outputs a corresponding phase corrected signal;

a channel decoder which inputs said phase corrected signal and generates a corresponding decoded signal; and a source decoder which inputs said decoded signal and expands said decoded signal into an expanded signal.

12. A high definition television (HDTV) as claimed in claim 10, wherein said offset remover comprises:

an offset estimator which calculates said average value of said offset for said predetermined number of symbols and generates said estimation value based on said average value; and a subtracter which subtracts said estimation value from said digital signal to produce said pure digital signal.

13. A high definition television (HDTV) as claimed in claim 10, wherein said detection signal generator comprises:

a carrier signal recovery detector which detects when said carrier signal has been recovered by comparing said estimation value with a first threshold value and outputs a corresponding carrier recovery signal;

a symbol timing recovery detector which detects when said symbol timing has been recovered based on a difference between said estimation value and a previous estimation value output from said offset remover and outputs a corresponding symbol timing recovery signal; and a signal generating circuit which inputs said carrier recovery signal and said symbol timing recovery signal and which outputs said recovery completion detection signal when said carrier recovery signal indicates that said carrier signal has been recovered and said symbol timing recovery signal indicates that said symbol timing has been recovered.

14. A high definition television (HDTV) as claimed in claim 13, wherein said carrier signal recovery detector comprises a first comparator for comparing said estimation value with said first threshold value and outputting said carrier recovery signal which indicates whether or not said carrier signal has been recovered.

15. A high definition television (HDTV) as claimed in claim 13, wherein said symbol timing recovery detector comprises:

a delay circuit which inputs said previous estimation value and delays said previous estimation value for a predetermined time period;

an arithmetic circuit which determines a difference between said previous estimation value output from said delay circuit and said estimation value output from said offset remover; and a second comparator which compares said difference output by said arithmetic circuit with a second threshold value and outputs said symbol timing recovery signal, wherein said symbol timing comparison symbol indicates whether or not said symbol timing has been recovered.

16. A high definition television (HDTV) as claimed in claim 15, wherein said arithmetic circuit comprises:

a subtracter which determines a subtraction value between said previous estimation value and said estimation value; and an absolute circuit which inputs said subtraction value, determines an absolute value of said subtraction value, and outputs said absolute value as said difference.

17. A high definition television (HDTV) as claimed in claim 15, wherein said carrier signal recovery detector comprises a first comparator for comparing said estimation value with said first threshold value and outputting said carrier recovery signal which indicates whether or not said carrier signal has been recovered.

18. A high definition television (HDTV) as claimed in claim 13, wherein said signal generating circuit comprises an AND gate.

19. A high definition television (HDTV) as claimed in claim 10, further comprising an automatic gain control (AGC) circuit which generates an AGC signal based on said digital signal, wherein said tuner inputs said AGC signal and amplifies said particular HDTV signal in accordance with said AGC signal and wherein said IF amplifier inputs said AGC signal and amplifies said particular HDTV signal in accordance with said AGC signal.

20. A high definition television comprising:

a tuner for selectively tuning a particular channel on which a particular HDTV signal is transmitted;

an intermediate frequency (IF) amplifier which inputs and amplifies said particular HDTV signal to produce an amplified signal;

an analog-to-digital (A/D) converter which inputs said amplified signal and converts said amplified signal into a digital signal, wherein said digital signal comprises a pilot signal;

a digital frequency and phase locked loop (DFPLL) circuit, wherein said DFPLL circuit inputs said digital signal, recovers a carrier signal corresponding to said digital signal by evaluating said pilot signal, and demodulates said digital signal into a baseband signal based on said carrier signal;

a symbol clock signal recovery circuit which inputs said baseband signal, estimates a sampling point at which said DFPLL should sample said digital signal, and outputs a symbol clock signal in accordance with said sampling point to said DFPLL;

an offset remover, wherein said offset remover calculates an average value of an offset of said baseband signal for a predetermined number of symbols of said baseband signal, generates an estimation value based on said average value, and removes said offset contained in said baseband signal by subtracting said estimation value from said baseband signal to produce a pure baseband signal;

a detection signal generator, which inputs said estimation value, determines when said carrier signal has been recovered based on said estimation value, determines when a symbol timing of said baseband signal has been recovered based on said estimation value, and generates a recovery completion detection signal when said carrier signal and said symbol timing have been recovered; and an equalizer, which inputs said pure baseband signal and said recovery completion detection signal, begins equalizing said pure baseband signal when said recovery completion detection signal indicates that said carrier signal and said symbol timing have been recovered, and outputs a corresponding undistorted signal.

21. A high definition television (HDTV) as claimed in claim 20, further comprising:

a phase tracking loop (PTL) circuit which inputs said undistorted signal, corrects a phase error in said undistorted signal, and outputs a corresponding phase corrected signal;

a channel decoder which inputs said phase corrected signal and generates a corresponding decoded signal; and a source decoder which inputs said decoded signal and expands said decoded signal into an expanded signal.

22. A high definition television (HDTV) as claimed in claim 20, wherein said offset remover comprises:

an offset estimator which calculates said average value of said offset for said predetermined number of symbols and generates said estimation value based on said average value; and a subtracter which subtracts said estimation value from said baseband signal to produce said pure baseband signal.

23. A high definition television (HDTV) as claimed in claim 20, wherein said detection signal generator comprises:

a carrier signal recovery detector which detects when said carrier signal has been recovered by comparing said estimation value with a first threshold value and outputs a corresponding carrier recovery signal;

a symbol timing recovery detector which detects when said symbol timing has been recovered based on a difference between said estimation value and a previous estimation value output from said offset remover and outputs a corresponding symbol timing recovery signal; and a signal generating circuit which inputs said carrier recovery signal and said symbol timing recovery signal and which outputs said recovery completion detection signal when said carrier recovery signal indicates that said carrier signal has been recovered and said symbol timing recovery signal indicates that said symbol timing has been recovered.

24. A high definition television (HDTV) as claimed in claim 23, wherein said carrier signal recovery detector comprises a first comparator for comparing said estimation value with said first threshold value and outputting said carrier recovery signal which indicates whether or not said carrier signal has been recovered.

25. A high definition television (HDTV) as claimed in claim 23, wherein said symbol timing recovery detector comprises:

a delay circuit which inputs said previous estimation value and delays said previous estimation value for a predetermined time period;

an arithmetic circuit which determines a difference between said previous estimation value output from said delay circuit and said estimation value output from said offset remover; and a second comparator which compares said difference output by said arithmetic circuit with a second threshold value and outputs said symbol timing recovery signal, wherein said symbol timing comparison symbol indicates whether or not said symbol timing has been recovered.

26. A high definition television (HDTV) as claimed in claim 25, wherein said arithmetic circuit comprises:

a subtracter which determines a subtraction value between said previous estimation value and said estimation value; and an absolute circuit which inputs said subtraction value, determines an absolute value of said subtraction value, and outputs said absolute value as said difference.

27. A high definition television (HDTV) as claimed in claim 25, wherein said carrier signal recovery detector comprises a first comparator for comparing said estimation value with said first threshold value and outputting said carrier recovery signal which indicates whether or not said carrier signal has been recovered.

28. A high definition television (HDTV) as claimed in claim 23, wherein said signal generating circuit comprises an AND gate.

29. A high definition television (HDTV) as claimed in claim 20, further comprising an automatic gain control (AGC) circuit which generates an AGC signal based on said baseband signal, wherein said tuner inputs said AGC signal and amplifies said particular HDTV signal in accordance with said AGC signal and wherein said IF amplifier inputs said AGC signal and amplifies said particular HDTV signal in accordance with said AGC signal.

30. A method for detecting when a carrier signal and a symbol timing have been recovered for a demodulated signal corresponding to a received television signal, comprising the steps of:

(a) calculating an average value of at least part of said demodulated signal for a predetermined number of symbols of said demodulated signal;

(b) determining an estimation value which corresponds to said average value;

(c) determining when said carrier signal and said symbol timing of said demodulated signal have been recovered based on said estimation value; and (d) generating a recovery completion detection signal when said carrier signal and said symbol timing have been recovered.

31. A method as claimed in claim 30, wherein said step (c) further comprises the steps of:

(c1) determining when said carrier signal has been recovered by comparing said estimation value with a first threshold value; and (c2) determining when said symbol timing has been recovered based on a difference between said estimation value and a previous estimation value.

32. A method as claimed in claim 31, wherein said step (c1) further comprises the steps of:

(c1*a*) comparing said estimation value with said first threshold value to obtain a first comparison result; and (c1*b*) outputting a carrier recovery signal which indicates whether or not said carrier signal has been recovered based on said first comparison result.

33. A method as claimed in claim 31, wherein said step (c2) further comprises the steps of:

(c2*a*) delaying said previous estimation value for a predetermined time period;

(c2*b*) determining a difference between said previous estimation value and said estimation value; and (c2*c*) comparing said difference with a second threshold value to obtain a second comparison result;

(c2d) outputting a symbol timing recovery signal based on said second comparison result, wherein said symbol timing recovery symbol indicates whether or not said symbol timing has been recovered.

34. A method as claimed in claim 33, wherein said step (c1) further comprises the steps of:

(c1*a*) comparing said estimation value with said first threshold value to obtain a first comparison result; and (c1*b*) outputting a carrier recovery signal which indicates whether or not said carrier signal has been recovered based on said first comparison result.

35. A method as claimed in claim 34, wherein said step (c) further comprises the steps of:

(c3) inputting said carrier recovery signal and said symbol timing recovery signal; and (c4) generating a recovery completion detection signal when said carrier recovery signal indicates that said carrier signal has been recovered and said symbol timing recovery signal indicates that said symbol timing has been recovered.

36. A method as claimed in claim 35, further comprising the step of:

(e) equalizing said demodulated signal to generate an equalized signal, wherein said step (e) is initiated after said recovery completion detection signal is generated.

* * * * *